(12) United States Patent
Lou et al.

(10) Patent No.: US 10,230,888 B2
(45) Date of Patent: Mar. 12, 2019

(54) SENSOR-BASED CAMERA INITIALIZATION

(71) Applicant: QUALCOMM Incorporated, San Diego, CA (US)

(72) Inventors: Ying Chen Lou, San Diego, CA (US); Ruben Velarde, Chula Vista, CA (US); Sanket Krishnamurthy Sagar, San Diego, CA (US); Hengzhou Ding, San Diego, CA (US); Liang Liang, San Diego, CA (US); Leung Chun Chan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/815,517

(22) Filed: Jul. 31, 2015

(65) Prior Publication Data

US 2017/0034432 A1 Feb. 2, 2017

(51) Int. Cl.
*H04N 5/232* (2006.01)
*H04N 5/14* (2006.01)
*H04N 5/235* (2006.01)
*H04N 21/422* (2011.01)
*H04N 21/4223* (2011.01)
*H04N 21/443* (2011.01)

(52) U.S. Cl.
CPC ..... *H04N 5/23216* (2013.01); *H04N 5/23241* (2013.01); *H04N 5/23245* (2013.01); *H04N 5/144* (2013.01); *H04N 5/232* (2013.01); *H04N 5/2356* (2013.01); *H04N 21/4223* (2013.01); *H04N 21/42202* (2013.01); *H04N 21/4436* (2013.01)

(58) Field of Classification Search
None
See application file for complete search history.

(56) References Cited

U.S. PATENT DOCUMENTS

| 9,223,136 | B1 * | 12/2015 | Braun | G02B 27/017 |
| 9,426,357 | B1 * | 8/2016 | Campbell | H04N 5/907 |
| 2004/0165073 | A1 | 8/2004 | Hayashi et al. | |
| 2006/0238623 | A1 | 10/2006 | Ogawa | |
| 2008/0136924 | A1 | 6/2008 | Washisu | |
| 2009/0086011 | A1 * | 4/2009 | Ek | H04N 1/00347 348/14.02 |

(Continued)

FOREIGN PATENT DOCUMENTS

| JP | 2005252800 A | 9/2005 |
| JP | 2009177563 A | 8/2009 |
| WO | 2011098899 A1 | 8/2011 |

OTHER PUBLICATIONS

International Search Report and Written Opinion for International Application No. PCT/US2016/036398, ISA/EPO, dated Aug. 19, 2016, 13 pgs.

*Primary Examiner* — Justin P. Misleh
(74) *Attorney, Agent, or Firm* — Qualcomm Incorporated—Toler

(57) ABSTRACT

An apparatus includes an initializer configured to adjust one or more settings of a camera prior to initialization of the camera. The one or more settings are adjusted based on an indication of motion detected using at least one measurement performed by a sensor device. The apparatus further includes a processing device configured to execute a camera application to initialize the camera after adjustment of the one or more settings.

30 Claims, 3 Drawing Sheets

(56) References Cited

U.S. PATENT DOCUMENTS

| | | | |
|---|---|---|---|
| 2010/0151903 A1 | 6/2010 | Yamamoto | |
| 2010/0289916 A1* | 11/2010 | Battles | H04N 5/235 348/222.1 |
| 2011/0157460 A1* | 6/2011 | Kim | H04N 5/232 348/372 |
| 2011/0199470 A1* | 8/2011 | Moller | G06F 1/1686 348/61 |
| 2012/0147531 A1* | 6/2012 | Rabii | H04W 52/0254 361/679.01 |
| 2014/0111638 A1 | 4/2014 | Isakov et al. | |
| 2014/0139696 A1* | 5/2014 | Lee | G06F 3/017 348/211.4 |
| 2014/0232633 A1* | 8/2014 | Shultz | H04M 1/72522 345/156 |
| 2014/0334729 A1* | 11/2014 | Manabe | H04N 1/6077 382/167 |
| 2014/0354874 A1* | 12/2014 | Lee | H04N 5/23222 348/348 |
| 2015/0092066 A1* | 4/2015 | Geiss | H04N 5/2258 348/180 |
| 2015/0156388 A1 | 6/2015 | Neglur | |
| 2015/0301581 A1* | 10/2015 | Ding | G06F 1/3206 713/320 |
| 2016/0241784 A1* | 8/2016 | Baek | G06F 1/3287 |
| 2016/0248986 A1* | 8/2016 | Mattisson | H04N 5/2258 |
| 2016/0295195 A1* | 10/2016 | Thorn | H04N 5/23219 |
| 2016/0337581 A1* | 11/2016 | Wang | H04N 5/232 |
| 2016/0381268 A1* | 12/2016 | Smith | H04N 5/235 348/222.1 |

\* cited by examiner

SENSOR-BASED CAMERA INITIALIZATION

This disclosure is generally related to electronic devices and more particularly to electronic devices that include a camera.

I. DESCRIPTION OF RELATED ART

Electronic devices may include cameras to enable users to capture images. For example, a mobile device may include a camera, and the mobile device may execute a camera application to enable a user to control the camera (e.g., by displaying a graphical interface with which the user may control the camera). The mobile device may deactivate the camera and the camera application while no images are being captured in order to reduce power consumption of the mobile device.

In some circumstances, initialization of the camera and the camera application (e.g., "waking" up the camera and loading the camera application from memory) may consume time, costing the user the opportunity to capture an image of a scene of interest or an interesting event. For example, initializing the camera may include calibrating one or more of a focus of the camera, an exposure compensation of the camera, or a white balance of the camera. After the camera is initialized, a target object may have moved out of focus (resulting in a blurry image) or an event of interest may have ended.

II. SUMMARY

In a particular example, an apparatus includes an initializer configured to adjust one or more settings of a camera prior to initialization of the camera. The one or more settings are adjusted based on an indication of motion detected using at least one measurement performed by a sensor device. The apparatus further includes a processing device configured to execute a camera application to initialize the camera after adjustment of the one or more settings.

In another example, a method includes generating an indication of motion associated with an electronic device prior to initializing a camera application of a camera of the electronic device. The method further includes performing at least one measurement using one or more sensors of the electronic device. The one or more sensors include one or more of a depth sensor, an illuminance sensor, or a spectral sensor. The at least one measurement is performed based on the indication. The method further includes adjusting one or more settings of the camera based on the at least one measurement and initializing the camera application after adjusting the one or more settings.

In another example, an apparatus includes means for generating, prior to initializing a camera application of a camera of an electronic device, an indication of motion associated with the electronic device. The apparatus further includes means for performing, based on the indication and prior to initializing the camera application, one or more measurements. The one or more measurements include one or more of a depth measurement, an illuminance measurement, or a spectral measurement. The apparatus further includes means for adjusting one or more settings of the camera based on the one or more measurements prior to initializing the camera application and means for initializing the camera application after adjustment of the one or more settings.

In another example, a computer-readable medium stores instructions executable by a processor to perform operations. The operations include adjusting one or more settings of a camera of an electronic device prior to initialization of the camera. The one or more settings are adjusted based on an indication of motion of the electronic device. The operations further include executing a camera application to initialize the camera after adjustment of the one or more settings.

III. BRIEF DESCRIPTION OF THE DRAWINGS

IV. DETAILED DESCRIPTION

Figure 1:
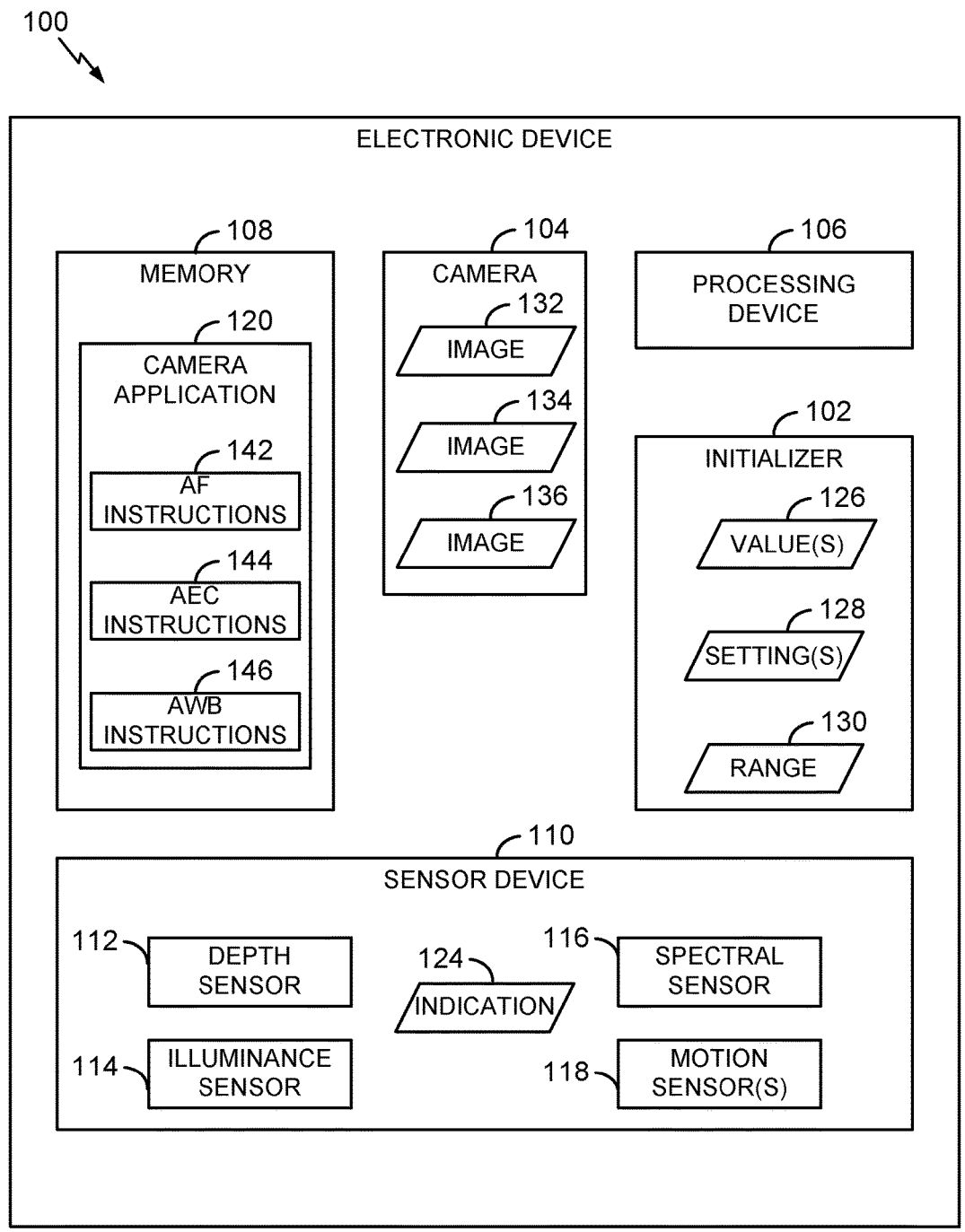
FIG. 1 is a block diagram of an illustrative example of an electronic device that is configured to perform sensor-based camera initialization.

FIG. 1 illustrates an electronic device 100. For example, the electronic device 100 may correspond to or be integrated within a mobile device (e.g., a cellular telephone) or a wearable device (e.g., a personal camera, a head mounted display, or a watch), or another electronic device, as illustrative examples.

The electronic device 100 may include an initializer 102, a camera 104, a processing device 106, a memory 108, and a sensor device 110. The sensor device 110 may include one or more sensors (e.g., a sensor array). For example, the sensor device 110 may include one or more of a depth sensor 112, an illuminance sensor 114, or a spectral sensor 116.

The sensor device 110 may further include one or more motion sensors 118. For example, the one or more motion sensors 118 may include one or more of a gyroscopic sensor configured to detect one or more of an orientation or a rotation of the electronic device 100, an accelerometer configured to measure an acceleration of the electronic device 100, a laser configured to generate an EM signal and/or a receiver configured to detect a reflection of the EM signal, a time-of-flight sensor (e.g., a lidar-based sensor), or a range finder (e.g., a device configured to measure a distance from the electronic device to a target object).

The camera 104 may include one or more image sensors. For example, the camera 104 may include one or more of a charge-coupled device (CCD) image sensor or a complementary metal-oxide-semiconductor (CMOS) image sensor. Further, although FIG. 1 illustrates a single camera for convenience of description, it should be appreciated that the electronic device 100 may include multiple cameras, and each camera may include a plurality of image sensors (e.g., an image sensor array). In some implementations, a camera may function as a sensor of the sensor device 110. For example, in a multi-camera implementation, a camera (e.g., the camera 104) may be configured to pre-initialize one or more other cameras of the electronic device 100. As an illustrative example, the camera 104 may function as a front camera (e.g., a lower power camera) that is configured to pre-initialize a rear camera (e.g., a higher power camera) of the electronic device 100 in response to the camera 104 detecting motion of the electronic device 100.

The processing device 106 may include a central processing unit (CPU) or a controller (e.g., a camera controller or microcontroller configured to control operations of the camera 104), as illustrative examples. Depending on the particular implementation, the initializer 102 may include hardware, instructions executable by a processor (e.g., by the processing device 106), or a combination thereof.

During operation, the camera 104 may capture images, such as in response to input received from a user of the electronic device 100. For example, operations of the camera 104 may be controlled by the processing device 106 by executing a camera application 120 retrieved from the memory 108. To further illustrate, the camera 104 may operate using one or more of an autofocus (AF) function, an auto-exposure control (AEC) function, or an automatic white balance (AWB) function. In this example, the camera application 120 may include one or more of AF instructions 142 executable by the processing device 106 to control the AF function, AEC instructions 144 executable by the processing device 106 to control the AEC function, or AWB instructions 146 executable by the processing device 106 to control the AWB function.

The electronic device 100 may initiate a camera standby mode (or sleep mode) if no images are being captured using the camera 104 (e.g., in response to a threshold time duration during which no images are captured using the camera 104, or as a default state upon power up of the electronic device 100 or when a user exits the camera application 120). Initiation of the camera standby mode may include reducing power supplied to the camera 104, deactivating the camera 104, ceasing to execute the camera application 120, or a combination thereof. The electronic device 100 may operate according to the camera standby mode until the camera 104 is initialized or "woken" and the camera application 120 is loaded from the memory 108 (e.g., in response to input received from a user of the electronic device 100).

During operation according to the camera standby mode, one or more of the depth sensor 112, the illuminance sensor 114, or the spectral sensor 116 may be configured to generate "rough" or approximate values used by the electronic device 100 to control the AF function, the AEC function, and the AWB function. For example, use of "rough" or approximate values may enable the camera 104 to operate according to the camera standby mode (to save power) while also facilitating fast initialization of the camera 104 (because functions of the camera 104 may be "pre-configured" so that one or more images may be captured prior to performing a "full" configuration process).

To further reduce power consumption of the electronic device 100, operation of one or more of the depth sensor 112, the illuminance sensor 114, or the spectral sensor 116 may be controlled based on an amount of motion of the electronic device 100. For example, if the electronic device 100 is relatively stationary (e.g., when the electronic device 100 is at rest on a surface or contained in a pocket or purse of a user), then a user is less likely to use the camera 104 to capture one or more images. In this case, one or more of the depth sensor 112, the illuminance sensor 114, or the spectral sensor 116 may be operated using a "low resolution" mode of operation.

To further illustrate, the sensor device 110 may be configured to generate an indication 124, such as an indication of an amount of motion of the electronic device 100 (e.g., an acceleration or a velocity) or an indication of whether the electronic device 100 is in motion or is stationary (e.g., a logic one value to indicate that motion is detected or a logic zero value otherwise). For example, depending on the particular implementation, the indication 124 may include a value (e.g., a current magnitude or a voltage) associated with an analog or digital signal generated by the one or more motion sensors 118. The indication 124 may indicate a low amount of motion, such as when the electronic device 100 is relatively stationary with respect to an object (e.g., when the electronic device 100 is at rest on a surface or contained in a pocket or purse of a user). Alternatively, the indication 124 may indicate that the electronic device 100 is in motion relative to an object (e.g., when a user of the electronic device 100 is positioning the electronic device 100). Depending on the particular implementation, the indication 124 may be generated by the depth sensor 112, the illuminance sensor 114, or the spectral sensor 116, or the one or more motion sensors 118.

The sensor device 110 may be configured to control operation of one or more of the depth sensor 112, the illuminance sensor 114, or the spectral sensor 116 based on the indication 124. As an example, in some implementations, the electronic device 100 is configured to power down (e.g., deactivate) one or more of the depth sensor 112, the illuminance sensor 114, or the spectral sensor 116 if the electronic device 100 is relatively stationary. In this example, the depth sensor 112, the illuminance sensor 114, or the spectral sensor 116 may remain powered down until the motion sensor 118 detects motion of the electronic device 100 or until occurrence of another event (e.g., receiving user input from a user of the electronic device 100). The electronic device 100 may be configured to power up one or more sensors of the sensor device 110 in response to motion of the electronic device 100 (or in response to at least a threshold amount of motion of the electronic device 100).

As another example, the sensor device 110 may be configured to adjust a duty cycle (also referred to herein as "sampling rate") associated with one or more of the depth sensor 112, the illuminance sensor 114, or the spectral sensor 116 by increasing or decreasing a number of samples per second. A duty cycle of any of the depth sensor 112, the illuminance sensor 114, or the spectral sensor 116 may be increased or decreased in response to the one or more motion sensors 118 indicating motion or a change of motion of the electronic device 100 (e.g., an increase in speed of the electronic device 100). As a non-limiting illustrative example, a duty cycle of any of the depth sensor 112, the illuminance sensor 114, or the spectral sensor 116 may be reduced to approximately one sample per second (e.g., from two samples per second, or from another sampling rate) in response to the amount of motion of the electronic device 100 identified by the indication 124 failing to satisfy a threshold (e.g., in response to a decrease in speed of the electronic device 100).

The sensor device 110 may be configured generate one or more values 126 based on the indication 124. For example, the sensor device 110 may perform at least one measurement to generate the one or more values 126 using any of the depth sensor 112, the illuminance sensor 114, or the spectral sensor 116.

To illustrate, the one or more values 126 may include a depth parameter measured by the depth sensor 112. The depth parameter may indicate a distance between the electronic device 100 and an object that is proximate to the electronic device 100. For example, in some implementations, the depth sensor may include a transceiver (or transmitter and receiver) configured to generate an electromagnetic (EM) signal (e.g., an infrared signal, a laser signal, or another signal) and to receive a reflection of the EM signal from an object that is proximate to the electronic device 100 (if any). In this example, the depth parameter may correspond to a time interval between transmitting the EM signal and receiving the EM signal. As another example, in some implementations, the depth sensor may include a transceiver (or transmitter and receiver) configured to generate an acoustic signal (e.g., an ultrasonic signal, or another signal) and to receive a reflection of the acoustic signal from an object that is proximate to the electronic device 100 (if any). In this example, the depth parameter may correspond to a time interval between transmitting the acoustic signal and receiving the acoustic signal.

Alternatively or in addition, the one or more values 126 may include an illuminance parameter measured by the illuminance sensor 114. The illuminance parameter may indicate a magnitude of ambient light proximate to the electronic device 100. To illustrate, the illuminance sensor 114 may be configured to detect an amount (e.g., magnitude) of EM radiation incident to the electronic device 100. In some implementations, the illuminance sensor 114 may be configured to "weight" wavelengths (or frequencies) associated with the amount of light based on a luminosity function that represents certain human vision characteristics. For example, the luminosity function may weight one or more wavelengths or ranges of wavelengths that are perceivable by human vision (e.g., a wavelength of approximately 500 nanometers (nm), which corresponds to a green color) more than one or more or more wavelengths or ranges of wavelengths that are not perceivable by human vision (e.g., a wavelength of approximately 200 nm, which corresponds to an ultraviolet characteristic). In this example, the illuminance parameter may indicate an amount of EM radiation proximate to the electronic device 100 that is perceivable by human vision. In other cases, the illuminance sensor 114 may not be configured based on the luminosity function (e.g., in order to capture information representing infrared wavelengths, ultraviolet wavelengths, or one or more other wavelengths). In this example, the illuminance parameter may indicate a "total" amount of EM radiation proximate to the electronic device 100 (which may include EM radiation that is not perceivable by human vision).

Alternatively or in addition, the one or more values 126 may include a spectral parameter measured by the spectral sensor 116. The spectral parameter may indicate a spectrum of ambient light proximate to the electronic device 100. To illustrate, the spectral parameter may indicate a magnitude of each of a plurality of wavelengths (or frequencies) or a plurality of ranges of wavelengths (or frequencies). In an illustrative implementation, the spectral parameter may indicate an amount of EM radiation associated with one or more of a violet range (e.g., approximately 380-450 nm), a blue range (e.g., approximately 450-495 nm), a green range (e.g., approximately 495-570 nm), a yellow range (e.g., approximately 570-590 nm), an orange range (e.g., approximately 590-620 nm), and a red range (e.g., approximately 620-750 nm). In some cases, the spectral parameter may indicate one or more other wavelengths or ranges or wavelengths, such as an infrared range or an ultraviolet range. In some implementations, the spectral sensor 116 may include an optical spectrometer configured to generate data indicating intensity of EM radiation proximate to the electronic device 100 as a function of wavelength (or frequency) of the EM radiation, and the spectral parameter may include the data.

The electronic device 100 may adjust or "pre-configure" (prior to initializing the camera application 120) one or more settings 128 of the camera 104 based on the one or more values 126. For example, adjusting the one or more settings 128 may include at least one of adjusting an AF setting (e.g., a lens position of a lens of the camera 104) based on the depth parameter, adjusting an AEC setting (e.g., an amount of gain applied to images captured using the camera 104) based on the illuminance parameter, or adjusting an AWB setting (e.g., a color temperature associated with images captured using the camera 104) based on the spectral parameter. In some cases, one or more of the settings may be pre-configured using non-sensor information, such as by selecting a daylight mode, a "cloudy" mode, or a fluorescent mode for the AWB setting based on date and time information stored at the electronic device 100 or provided to the electronic device 100 (e.g., by a cellular service provider, as an illustrative example).

To further illustrate, pre-configuring the camera 104 may include adjusting a lens focal position of a lens of the camera 104 based on a depth parameter indicated by the one or more values 126. In this example, if an object is detected by the depth sensor 112 at a particular distance from the depth sensor 112, a value associated with the indication 124 may correspond to the particular distance. The lens of the camera 104 may be adjusted based on the particular distance (prior to initialization of the camera 104 by executing the camera application 120). After initialization of the camera 104 by executing the camera application 120, AF convergence may occur more rapidly (because the lens position is "pre-adjusted"). Alternatively, when no object is detected by the depth sensor 112, then one or more objects near the electronic device 100 (if any) may be out of range of the depth sensor 112. In this case, the value of the indication 124 may indicate that no object is detected, and the lens of the camera 104 may be adjusted to a particular position (e.g., a hyperfocal position) in case a user of the electronic device 100 initiates capturing of an image of a distant object or scene. As an example, a landmark may be out of range of the depth sensor 112. In this case, the lens of the camera 104 may be adjusted to the hyperfocal position in case a user of the electronic device 100 initiates capturing of an image of the landmark (to reduce a time associated with the AF convergence process spent "searching" for a lens position). In this example, the initializer 102 may include circuitry configured to receive the indication 124 from the sensor device 110 and to generate one or more lens position control signals to control the lens of the camera 104.

In certain implementations, the one or more values 126 include each of the depth parameter, the illuminance parameter, and the spectral parameter. In this case, the electronic device 100 is configured to perform a "3A" pre-adjustment process in which each of the AF setting, the AEC setting, and the AWB setting are pre-adjusted prior to initialization of the camera 104. In other implementations, use of one or more of the parameters may be omitted in connection with pre-adjustment of the camera 104. For example, AEC processing and/or AWB processing may be performed after image capture (e.g., during post-processing of an image). To illustrate, in some cases, AEC processing may be performed during post-processing (or may be performed "offline") using a post-processing gain adjustment process. In this example, use of the illuminance sensor 114 and/or the spectral sensor 116 may be omitted during pre-adjustment operations of the electronic device 100. In some implementations, the camera application 120 may enable rapid image capture (or a "quick start" feature). For example, the camera application 120 may enable a user of the electronic device 100 to capture images without loading a "full" camera application of the electronic device 100. In other implementations, the camera application 120 may correspond to a "full" camera application (e.g., a camera utility included in an operating system of the electronic device 100). In some cases, the camera application 120 may be pre-initialized based on input from the sensor device 110. For example, in some cases, the camera application 120 may be loaded in response to the sensor device 110 generating the indication 124 (e.g., prior to receiving user input to load the camera application 120).

After adjusting the one or more settings 128, the electronic device 100 may initialize (or configure) the camera 104. For example, a user may provide an indication to cause the electronic device 100 to activate the camera application 120 (e.g., by pressing a hard key or a soft key of the electronic device 100, or by selecting an icon associated with the camera application 120 using a touchscreen of the electronic device 100). Initializing the camera 104 may include retrieving the camera application 120 from the memory 108 after adjustment of the one or more settings 128 and executing the camera application 120 by the processing device 106 (e.g., to initiate a 3A adjustment process).

After activating the camera application 120 (and prior to completion of the 3A adjustment process), the user may capture one or more images (e.g., a first image 132) using the camera 104. When the camera application 120 is initialized, the one or more settings 128 have been adjusted based on the one or more values 126 (e.g., before a "full" 3A adjustment process is performed). Adjusting the one or more settings 128 using the one or more values 126 may enable pre-configuring of the camera 104 to reduce latency at the electronic device 100 when activating the camera application 120 (as compared to "waiting" to adjust the settings 128 until the 3A adjustment process is complete).

In some cases, the electronic device 100 may perform a "bracketing" (or "burst mode") process while capturing the first image 132. For example, in response to user input indicating capture of a single image, multiple images may be captured using a range of settings 130 (e.g., in case one or more of the AF function, the AEC function, or the AWB function are not "fully" calibrated prior to completion of the 3A adjustment process). To illustrate, if the user input causes the camera to capture the first image 132 based on a first value of the one or more values 126, the camera 104 may capture a second image 134 using a second value (e.g., the first value plus a delta value) and may capture a third image 136 using a third value (e.g., the first value minus the delta value).

To illustrate, a bracketing process may include using multiple lens focal positions of the camera 104 to obtain multiple images associated with different foci. In this case, the first image 132 may be captured using a first focal position of the camera 104, the second image 134 may be captured using a second focal position (e.g., the first focal position plus a delta value), and the third image 136 may be captured using a third focal position (e.g., the first focal position minus the delta value). Alternatively or in addition, a bracketing process may include capturing multiple images (e.g., the images 132, 134, and 136) using a range of AEC settings of the camera 104, a range of AWB settings of the camera 104, or a combination thereof.

A particular one of the images 132, 134, and 136 may be selected (e.g., in connection with a post-processing operation). To illustrate, the first image 132 may be selected as being the "best" image during post-processing of the images and/or based on input from a user of the electronic device 100. In some cases, one or more of the images 134, 136 may be discarded (e.g., deleted or flagged for deletion) in response to selecting the first image 132.

It is noted that in some implementations, post-processing operations may include performing AEC adjustment and/or performing AWB adjustment. In these implementations, the one or more values 126 may correspond to depth parameters generated by the depth sensor 112, and the one or more settings 128 may correspond to settings for the AF function of the camera 104. In these implementations, one or more of the illuminance sensor 114, the spectral sensor 116, or the one or more motion sensors 118 may be omitted from the electronic device 100 or may not be used during pre-adjustment operations.

Capturing one or more images (e.g., the first image 132) based on the one or more values 126 may enable fast initialization of the camera 104 while also reducing power consumption of the electronic device 100 (e.g., by enabling the camera 104 to operate according to a camera standby mode while images are not being captured). When the camera application 120 is initialized, the one or more settings 128 have been adjusted based on the one or more values 126 (e.g., before a "full" 3A adjustment process is performed). Adjusting the one or more settings 128 using the one or more values 126 may enable pre-configuring of the camera 104 to reduce latency at the electronic device 100 when activating the camera application 120 (as compared to "waiting" to adjust the settings 128 until the 3A adjustment process is complete). Thus, a user may be able to more quickly capture an image of a scene of interest. Further, sensor power consumption may be controlled by determining a duty cycle of one or more sensors of the sensor device 110 using an amount of motion of the electronic device 100 (e.g., so that the sensor device 110 may be less active when images are less likely to be captured, such as when the electronic device 100 is contained within a purse or pocket of a user).

Figure 2:
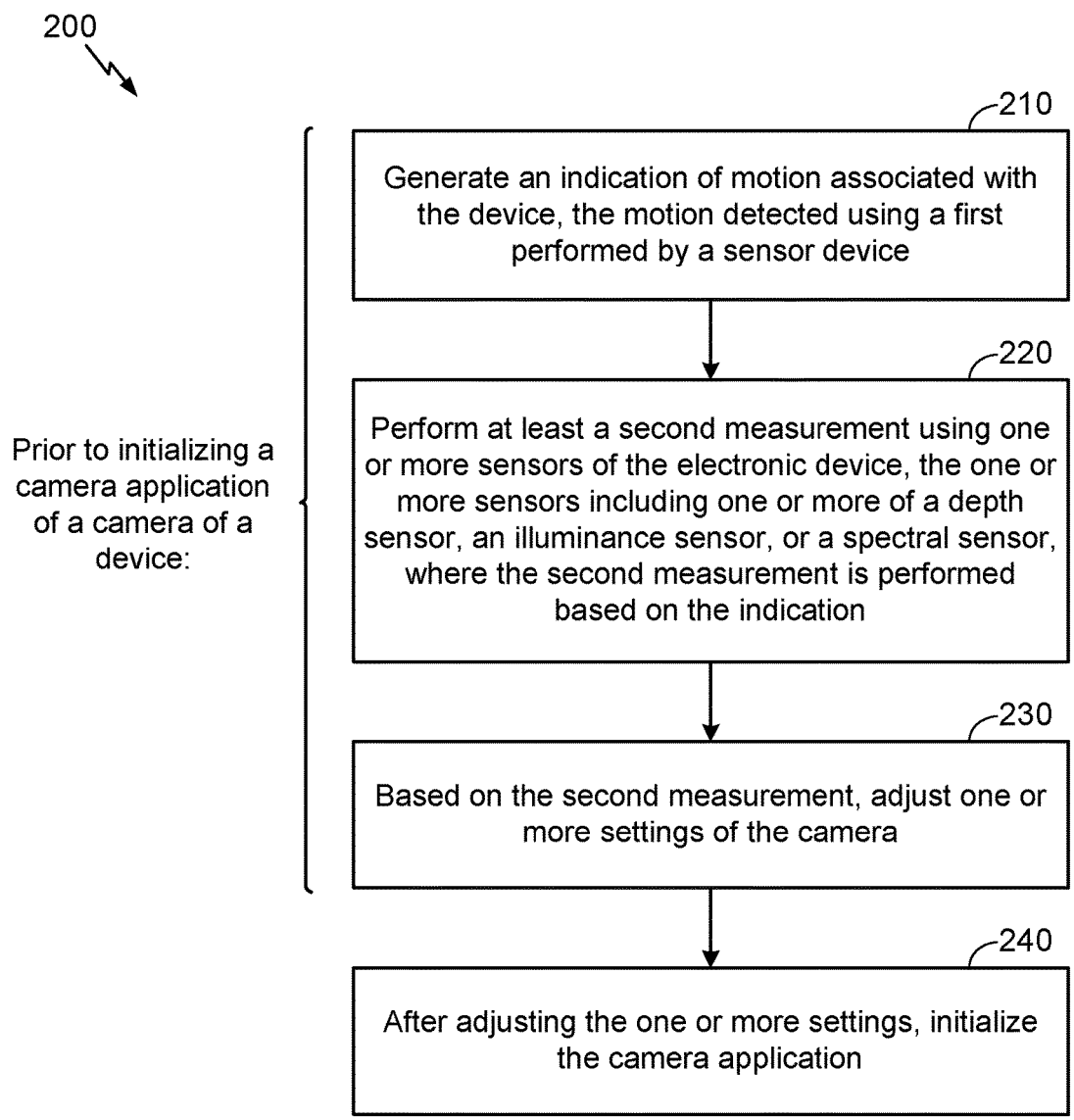
FIG. 2 is a flow chart that illustrates an example of a method of operation of an electronic device, such as the electronic device of FIG. 1.

Referring to FIG. 2, a particular illustrative example of a method is depicted and generally designated 200. The method may be performed at an electronic device (e.g., at the electronic device 100 of FIG. 1).

The method 200 may include generating an indication of motion associated with an electronic device prior to initializing a camera application of a camera of the electronic device, at 210. The motion may be detected using a first measurement performed by a sensor device (e.g., the sensor device 110). For example, the indication may correspond to the indication 124, and the camera application may correspond to the camera application 120. The indication may be generated by a sensor of the sensor device 110. For example, the indication may be generated using the one or more motion sensors 118, which may include one or more of a gyroscopic sensor, an accelerometer, a laser, a time-of-flight sensor, or a range finder, as illustrative examples. In another implementation, the indication is generated using a depth sensor (e.g., the depth sensor 112), an illuminance sensor (e.g., the illuminance sensor 114), or a spectral sensor (e.g., the spectral sensor 116).

In some implementations, the method 200 includes initiating a low power mode of operation based on the indication by deactivating the one or more sensors or by reducing a sample rate of the one or more sensors. Alternatively or in addition, the method 200 may include terminating a low power mode of operation based on the indication by activating the one or more sensors or by increasing a sample rate of the one or more sensors.

The method 200 may further include performing at least a second measurement based on the indication using one or more sensors of the electronic device prior to initializing the camera application, at 220. For example, the sensor device 110 of FIG. 1 may be configured to perform the second measurement (e.g., to generate the one or more values 126). The one or more sensors may include one or more of a depth sensor (e.g., the depth sensor 112), an illuminance sensor (e.g., the illuminance sensor 114), or a spectral sensor (e.g., the spectral sensor 116).

In an illustrative implementation, the second measurement is performed based on a duty cycle. In this case, the method 200 may further include adjusting the duty cycle based on the indication (e.g., to increase or decrease a sampling rate based on the indication). To illustrate, the duty cycle may be increased in response to the indication specifying that the electronic device is in motion relative to an object, or the duty cycle may be decreased in response to the indication specifying that the electronic device is stationary.

The method 200 may further include adjusting one or more settings of the camera based on the second measurement prior to initializing the camera application, at 230. For example, the one or more settings may correspond to the one or more settings 128. To illustrate, adjusting the one or more settings of the camera may include adjusting an AF setting of the camera based on a depth parameter. In another implementation, adjusting the one or more settings of the camera includes adjusting an AEC setting of the camera based on an illuminance parameter. In another example, adjusting the one or more settings of the camera includes adjusting an AWB setting of the camera based on a spectral parameter. In another implementation, adjusting the one or more settings of the camera includes one or more of adjusting the AF setting of the camera based on the depth parameter, adjusting the AEC setting of the camera based on the illuminance parameter, and adjusting the AWB setting of the camera based on the spectral parameter.

The method 200 may further include initializing the camera application after adjusting the one or more settings, at 240. For example, initializing the camera application may include configuring the camera application by loading the camera application from a memory (e.g., the memory 108) of the electronic device to a processor (e.g., the processing device 106) of the electronic device to launch the camera application.

The method 200 may optionally include capturing a first image (e.g., the first image 132) using the camera based on the adjusted one or more settings after initializing the camera application and readjusting, after capturing the first image, the one or more settings. The method 200 may also include capturing at least one second image (e.g., the second image 134, the third image 136, or a combination thereof) using the readjusted one or more settings and selecting (or receiving a selection of) one of the first image and the at least one second image. As an example, one of the images 132, 134, and 136 may be selected, and the others of the images 132, 134, and 136 may be discarded (e.g., deleted or flagged for deletion). In an illustrative implementation, the one or more settings are readjusted in connection with a bracketing operation that includes modifying a particular setting of the one or more settings to within a particular range of settings (e.g., the range of settings 130), such as by modifying a focal position within a range of focal positions, as an illustrative example.

In some implementations, the method 200 includes performing one or more post-processing operations after capturing an image. For example, the one or more post-processing operations include adjusting an AWB setting associated with the image.

The method 200 may enable an electronic device to perform fast camera initialization while also enabling low power consumption of the electronic device. For example, one or more sensors may be used to initialize a camera (enabling the camera to remain in a low power or standby mode), and an amount of motion of the electronic device may be used to control operation of the one or more sensors (e.g., by reducing a duty cycle associated with the one or more sensors when the amount of motion is low).

Figure 3:
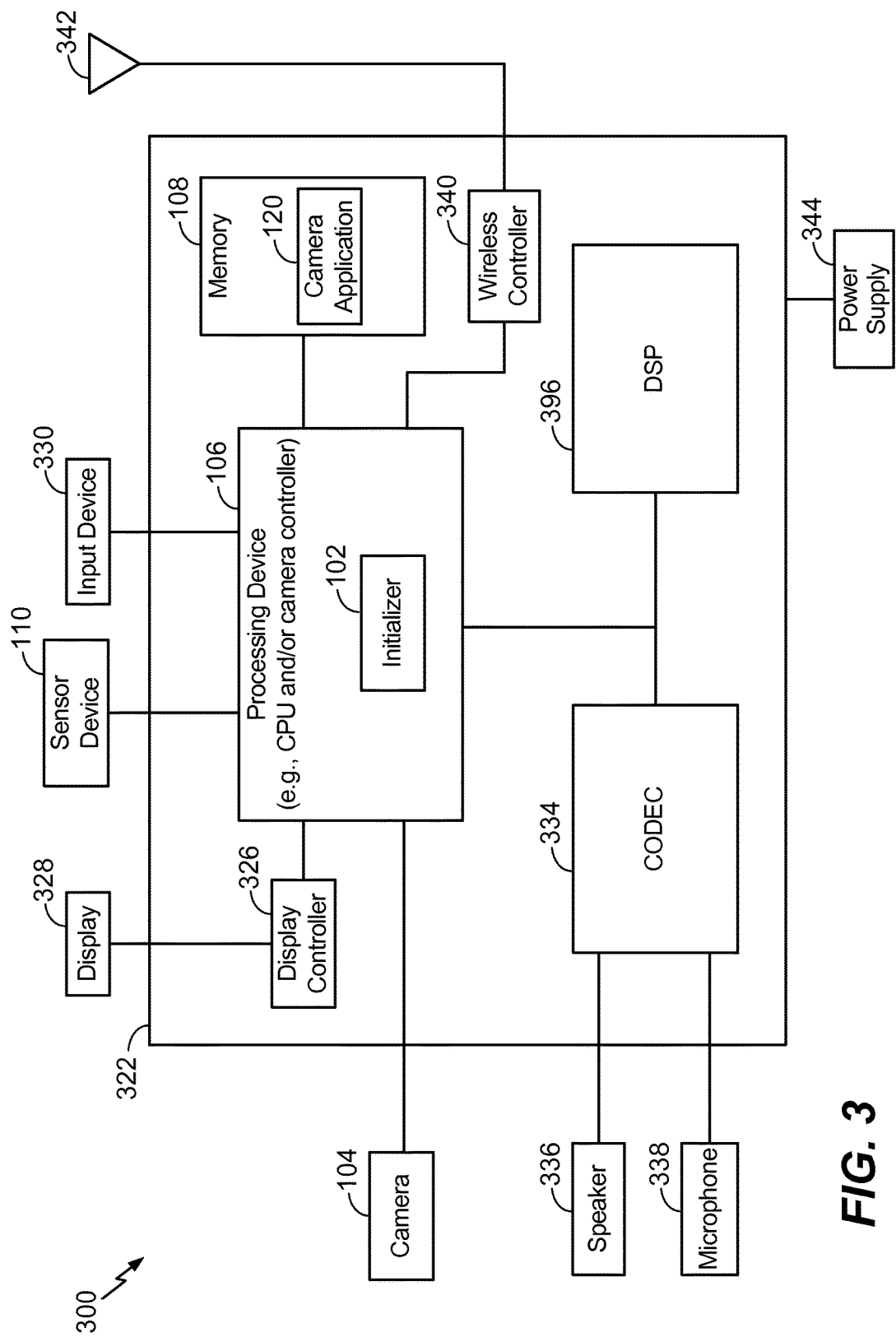
FIG. 3 is a block diagram of an illustrative example an electronic device that is configured to perform sensor-based camera initialization.

FIG. 3 is a block diagram of an illustrative example of an electronic device 300 (e.g., the electronic device 100 of FIG. 1). For example, the electronic device 300 may correspond to or be integrated within a mobile device (e.g., a cellular telephone) or a wearable device (e.g., a personal camera, a head mounted display, or a watch), or another electronic device, as illustrative examples.

The electronic device 300 may include the processing device 106 of FIG. 1. For example, the processing device 106 may include a CPU, a camera controller, another processing device, or a combination thereof. In the example of FIG. 3, the processing device 106 includes the initializer 102. For example, the initializer 102 may include instructions executable by the processing device 106. Alternatively or in addition, the initializer 102 may include one or more hardware components of the processing device 106. In one or more other implementations, the initializer 102 may be external to the processing device 106. For example, the initializer 102 may include hardware and/or instructions integrated within a camera controller or other device that is coupled to the processing device 106.

The electronic device 300 may further include the memory 108. The memory 108 may include a non-transitory computer-readable medium that stores instructions executable by the processing device 106. For example, the instructions may include instructions of the camera application 120 of FIG. 1. A non-transitory computer-readable medium may include a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), another memory device, or a combination thereof.

The electronic device 300 may further include a coder/decoder (CODEC) 334. The CODEC 334 may be coupled to the processing device 106. The CODEC 334 may be coupled to one or more of a speaker 336 or a microphone 338. The CODEC 334 may include a memory, such as a memory storing instructions executable by a processing unit of the CODEC 334.

The electronic device 300 may also include a digital signal processor (DSP) 396. The DSP 396 may be coupled to the processing device 106 and to the CODEC 334. The DSP 396 may execute instructions, such as instructions retrieved from the memory 108.

FIG. 3 also shows a display controller 326 that is coupled to the processing device 106 and to a display 328. FIG. 3 also indicates that a wireless controller 340 can be coupled to the processing device 106 and to an antenna 342.

In a particular example, the processing device 106, the display controller 326, the memory 108, the CODEC 334, the wireless controller 340, and the DSP 396 are included in a system-in-package or system-on-chip device 322. An input device 330, such as a touchscreen and/or keypad, and a power supply 344 may be coupled to the system-on-chip device 322. Moreover, as illustrated in FIG. 3, the display 328, the input device 330, the speaker 336, the microphone 338, the antenna 342, and the power supply 344 may be external to the system-on-chip device 322. However, each of the display 328, the input device 330, the speaker 336, the microphone 338, the antenna 342, and the power supply 344 can be coupled to a component of the system-on-chip device 322, such as to an interface or a controller.

An apparatus may include means (e.g., the one or more motion sensors 118) for generating, prior to initializing a camera application (e.g., the camera application 120) of a camera (e.g., the camera 104) of an electronic device (e.g., one or more of the electronic device 100 or the electronic device 300), an indication (e.g., the indication 124) of motion associated with the electronic device. The apparatus further includes means (e.g., one or more of the depth sensor 112, the illuminance sensor 114, or the spectral sensor 116) for performing, based on the indication and prior to initializing the camera application, one or more measurements. The one or more measurements include one or more of a depth measurement, an illuminance measurement, or a spectral measurement.

The apparatus further includes means for adjusting one or more settings (e.g., the one or more settings 128) of the camera based on the one or more measurements prior to initializing the camera application and means (e.g., the processing device 106) for initializing the camera application after adjustment of the one or more settings. The apparatus may further include a sensor device (e.g., the sensor device 110) configured to determine a duty cycle based on the indication, and the one or more measurements may be performed based on the duty cycle. For example, the sensor device 110 may be configured to increase the duty cycle in response to an indication that the electronic device is in motion. As another example, the sensor device 110 may be configured to decrease the duty cycle in response to an indication that the electronic device is stationary. In an illustrative implementation, the apparatus further includes means for storing (e.g., the memory 108) the camera application. The means for initializing the camera application includes a processing device (e.g., the processing device 106) configured to access the camera application from the means for storing.

A computer-readable medium (e.g., the memory 108) may store instructions (e.g., instructions of the camera application 120) executable by a processor to perform operations. The operations may include adjusting one or more settings (e.g., the one or more settings 128) of a camera (e.g., the camera 104) of an electronic device (e.g., any of the electronic devices 100, 300) prior to initialization of the camera. The one or more settings are adjusted based on an indication of motion of the electronic device (e.g., based on the indication 124). The operations may further include executing a camera application (e.g., the camera application 120) to initialize the camera after adjustment of the one or more settings.

In the foregoing description, various functions and operations have been described as being implemented or performed by certain components or modules. It is noted that in some implementations, a function or operation described as being implemented or performed by a particular component or module may instead be implemented or performed using multiple components or modules. Moreover, in some implementations, two or more components or modules described herein may be integrated into a single component or module. One or more components or modules described herein may be implemented using hardware (e.g., a field-programmable gate array (FPGA) device, an application-specific integrated circuit (ASIC), a DSP, and/or a controller, as illustrative examples), instructions executable by a processor, or any combination thereof.

Those of skill would further appreciate that the various illustrative logical blocks, configurations, modules, circuits, and algorithm steps described in connection with the aspects disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the disclosure.

One or more operations of a method or algorithm described herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an ASIC. The ASIC may reside in a computing device or a user terminal. In the alternative, the processor and the storage medium may reside as discrete components in a computing device or a user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. An apparatus comprising:
a memory; and
a processor configured to receive an indication of motion associated with a camera and to receive one or more measurements performed by a sensor device in response to the indication of motion, wherein the one or more measurements include one or more of a depth measurement, an illuminance measurement, or a spectral measurement,
wherein the processor is further configured to adjust, during a standby mode of operation of the camera, one or more settings of the camera based on the one or more measurements, the standby mode associated with a first power consumption level of the camera,
wherein the processor is further configured to execute a camera application to initialize the camera after adjustment of the one or more settings and to operate the camera in an operation mode associated with a second power consumption level that is greater than the first power consumption level, and wherein the processor is further configured, after initialization of the camera, to cause the camera to capture one or more images using the adjusted one or more settings and to further adjust the one or more settings based on the one or more images.

2. The apparatus of claim 1, further comprising the sensor device, wherein the sensor device is configured to adjust a sample rate associated with one or more sensors of the sensor device based on the indication.

3. The apparatus of claim 1, wherein the sensor device includes one or more of a depth sensor configured to generate the depth measurement, an illuminance sensor configured to generate the illuminance measurement, or a spectral sensor configured to generate the spectral measurement.

4. The apparatus of claim 1, wherein the sensor device includes a motion sensor configured to generate the indication, and wherein the motion sensor includes one or more of a gyroscopic sensor, an accelerometer, a laser, a time-of-flight sensor, or a range finder.

5. The apparatus of claim 1, further comprising:
an antenna; and
a receiver coupled to the antenna and configured to receive an encoded audio signal.

6. The apparatus of claim 5, wherein the memory, the processor, the antenna, and the receiver are integrated into a mobile device.

7. The apparatus of claim 1, wherein the sensor device includes one of a depth sensor configured to generate the depth measurement, an illuminance sensor configured to generate the illuminance measurement, or a spectral sensor configured to generate the spectral measurement in response to the indication of motion and during the standby mode of operation of the camera.

8. The apparatus of claim 1, wherein the sensor device is configured to power up one or more sensors of the sensor device in response to the indication of motion and during the standby mode of operation of the camera.

9. The apparatus of claim 1, further comprising a plurality of cameras that includes the camera and a second camera.

10. The apparatus of claim 9, wherein the camera is configured to pre-initialize the second camera in response to the indication of motion.

11. A method of operation of an electronic device, the method comprising:
prior to initializing a camera of an electronic device:
generating an indication of motion associated with the electronic device, the motion detected based on a first measurement performed by a sensor device;
performing at least a second measurement using one or more sensors of the electronic device, the one or more sensors including one or more of a depth sensor, an illuminance sensor, or a spectral sensor, wherein the second measurement is performed based on the indication;
during a standby mode of operation of the camera associated with a first power consumption level of the camera, adjusting one or more settings of the camera based on the second measurement;
after adjusting the one or more settings, initializing the camera to operate in an operating mode associated with a second power consumption level that is greater than the first power consumption level; and
after initialization of the camera:
causing the camera to capture one or more images using the adjusted one or more settings; and
further adjusting the one or more settings based on the one or more images.

12. The method of claim 11, wherein the second measurement is performed based on a duty cycle, and further comprising adjusting the duty cycle based on the indication.

13. The method of claim 12, wherein the duty cycle is increased in response to the indication specifying that the electronic device is in motion relative to an object.

14. The method of claim 12, wherein the duty cycle is decreased in response to the indication specifying that the electronic device is stationary.

15. The method of claim 11, wherein the one or more settings are further adjusted within a particular range of values in connection with a bracketing operation; that is performed to capture at least a first image and a second image prior to completion of an autofocus, auto-exposure control, and automatic white balance (3A) configuration process, and further comprising discarding one of the first image and the at least one second image.

16. The method of claim 11, wherein adjusting the one or more settings includes adjusting an autofocus (AF) setting of the camera based on a depth measurement that is generated using the depth sensor.

17. The method of claim 16, further comprising performing one or more post-processing operations after capturing the one or more images, wherein the one or more post-processing operations include adjusting one or more parameters associated with the one or more images.

18. The method of claim 11, wherein adjusting the one or more settings includes adjusting an auto-exposure control (AEC) setting of the camera based on an illuminance measurement that is generated using the illuminance sensor.

19. The method of claim 11, further comprising, in response to the indication of motion, powering up the spectral sensor from a sleep mode of operation.

20. The method of claim 11, wherein adjusting the one or more settings includes:
adjusting an auto-white balance (AWB) setting of the camera based on a spectral measurement that is generated using the spectral sensor;
adjusting an autofocus (AF) setting of the camera based on a depth measurement that is generated using the depth sensor; and
adjusting an auto-exposure control (AEC) setting of the camera based on an illuminance measurement that is generated using the illuminance sensor.

21. The method of claim 11, further comprising:
initiating a low power mode of operation of the one or more sensors based on the indication by deactivating the one or more sensors or by reducing a sample rate of the one or more sensors; or
terminating the low power mode of operation of the one or more sensors based on the indication by activating the one or more sensors or by increasing a sample rate of the one or more sensors.

22. The method of claim 11, wherein the electronic device comprises a mobile device.

23. The method of claim 11, wherein initializing the camera includes waking the camera from the standby mode of operation.

24. The method of claim 11, wherein the camera is in a deactivated state during the standby mode of operation, and further comprising wherein adjusting the one or more settings includes adjusting an auto-white balance (AWB) setting of the camera during the standby mode of operation.

25. The method of claim 11, further comprising performing an autofocus, auto-exposure control, and automatic white balance (3A) adjustment process to complete initialization of the camera.

26. The method of claim 25, further comprising, after performing the 3A adjustment process, causing the camera to capture one or more additional images using one or more particular settings of the camera determined using the 3A adjustment process.

27. An apparatus comprising:
   means for generating, prior to initializing a camera application of a camera of an electronic device, an indication of motion associated with the electronic device;
   means for performing, based on the indication and prior to initializing the camera application, one or more measurements, the one or more measurements including one or more of a depth measurement, an illuminance measurement, or a spectral measurement;
   means for adjusting, prior to initialization of the camera and during a standby mode of operation of the camera associated with a first power consumption level of the camera, one or more settings of the camera based on the one or more measurements;
   means for initializing the camera application, after adjustment of the one or more settings, to operate the camera in an operating mode associated with a second power consumption level that is greater than the first power consumption level; and
   means for, after initialization of the camera, causing the camera to capture one or more images using the adjusted one or more settings and for further adjusting the one or more settings based on the one or more images.

28. The apparatus of claim 27, wherein the means for generating the indication, the means for performing the one or more measurements, the means for adjusting the one or more settings, the means for initializing the camera, and the means for causing the camera to capture the one or more images are integrated into a mobile device.

29. A computer-readable medium storing instructions executable by a processor to perform operations comprising:
   receiving an indication of motion associated with an electronic device that includes a camera;
   receiving one or more measurements performed by a sensor device in response to the indication of motion, wherein the one or more measurements include one or more of a depth measurement, an illuminance measurement, or a spectral measurement;
   during a standby mode of operation of the camera associated with a first power consumption level of the camera and prior to initialization of the camera, adjusting one or more settings of the camera based on the one or more measurements;
   after adjustment of the one or more settings, executing a camera application to initialize the camera to operate the camera in an operating mode associated with a second power consumption level that is greater than the first power consumption level; and
   after initialization of the camera:
      causing the camera to capture one or more images using the adjusted one or more settings; and
      further adjusting the one or more settings based on the one or more images.

30. The computer-readable medium of claim 29, wherein the operations further include loading the camera application from a memory of the electronic device to launch the camera application.

\* \* \* \* \*